United States Patent
Rowley

(10) Patent No.: US 10,458,374 B2
(45) Date of Patent: Oct. 29, 2019

(54) FUEL VAPORIZING SYSTEM

(71) Applicant: Gerald W Rowley, Delray Beach, FL (US)

(72) Inventor: Gerald W Rowley, Delray Beach, FL (US)

( * ) Notice: Subject to any disclaimer, the term of this patent is extended or adjusted under 35 U.S.C. 154(b) by 361 days.

(21) Appl. No.: 15/006,213

(22) Filed: Jan. 26, 2016

(65) Prior Publication Data

US 2017/0211525 A1 Jul. 27, 2017

(51) Int. Cl.
| | |
|---|---|
| *F02M 31/18* | (2006.01) |
| *F02M 27/02* | (2006.01) |
| *F01N 5/02* | (2006.01) |
| *F01P 3/20* | (2006.01) |

(52) U.S. Cl.
CPC .......... *F02M 31/183* (2013.01); *F01N 5/02* (2013.01); *F02M 27/02* (2013.01); *F02M 31/18* (2013.01); *F01N 2240/02* (2013.01); *F01P 3/20* (2013.01); *F01P 2060/10* (2013.01); *Y02T 10/126* (2013.01); *Y02T 10/16* (2013.01)

(58) Field of Classification Search
CPC ......... F02M 31/183; F02M 27/02; F01P 2/30; F01P 2060/10; F01N 5/02
USPC ................. 123/557, 538, 541, 546
See application file for complete search history.

(56) References Cited

U.S. PATENT DOCUMENTS

| | | | | |
|---|---|---|---|---|
| 1,267,185 A | * | 5/1918 | Coffman | F28F 27/02 123/557 |
| 1,318,265 A | * | 10/1919 | Clemmensen | F02M 31/16 123/557 |
| 1,332,327 A | * | 3/1920 | Eastwood | F02M 31/093 165/52 |
| 2,240,311 A | * | 4/1941 | Mills | F02M 31/16 123/553 |
| 3,935,901 A | * | 2/1976 | Virgil | F02M 31/16 123/557 |
| 4,306,617 A | * | 12/1981 | Lancaster | F02M 31/16 123/557 |
| 4,349,001 A | | 9/1982 | Wagner | |
| 4,393,851 A | * | 7/1983 | Gorans | F02M 31/16 123/552 |
| 4,406,270 A | * | 9/1983 | Simonson, Sr. | F02M 31/16 123/557 |
| 4,463,739 A | | 8/1984 | Niblett | |
| 4,582,040 A | | 4/1986 | Niblett | |
| 4,700,047 A | | 10/1987 | Crossett et al. | |
| 4,711,223 A | * | 12/1987 | Carroll | F02B 1/02 123/1 A |

(Continued)

*Primary Examiner* — Lindsay M Low
(74) *Attorney, Agent, or Firm* — Bachman & LaPointe, P.C.

(57) ABSTRACT

A fuel heater and vaporizing system includes a source of fuel, a thermal source from an engine, and a heat exchanger for thermally contacting the source of heated fluid so as to heat fuel flowing through the heat exchanger. The heat exchanger has a saddle shape and fits over the thermal source of engine heat. The fuel heater and vaporizing system may also contain a catalyst for causing the heated fuel to crack prior to distribution to an end use device. In an alternative arrangement, the fuel heater and vaporizing system may also extract its heat from the engine's other heated parts including a muffler or an exhaust pipe, exhaust manifold, valve cover, turbo housing, engine block, transmission and the like.

25 Claims, 3 Drawing Sheets

(56) References Cited

U.S. PATENT DOCUMENTS

| | | | | |
|---|---|---|---|---|
| 4,865,004 A | * | 9/1989 | Widmer | F02M 31/20 |
| | | | | 123/541 |
| 5,881,702 A | * | 3/1999 | Arkfeld | F02M 27/06 |
| | | | | 123/538 |
| 7,942,135 B1 | * | 5/2011 | Daywalt | F02M 27/02 |
| | | | | 123/538 |
| 8,707,934 B2 | * | 4/2014 | Rowley | F02M 27/02 |
| | | | | 123/538 |
| 2007/0151547 A1 | * | 7/2007 | Poje | B01D 35/18 |
| | | | | 123/557 |

* cited by examiner

FUEL VAPORIZING SYSTEM

BACKGROUND

The present invention relates to a fuel vaporizer system for heating fuel such as gasoline, alcohol, kerosene, diesel, or ethanol, to be used in engines and generators.

It has been recognized that the efficiency and fuel economy of an internal combustion engine can be improved by preheating the fuel supplied to the engine. Fuel preheating can be accomplished by passing the fuel in route to the engine in heat relationship with engine coolant and/or engine exhaust and/or engine heat from oil and/or engine components. U.S. Pat. Nos. 4,582,040; 4,700,047; 4,349,001; and 4,463,739 illustrate some of these heating systems.

Despite the existence of these systems, there remains a need for a fuel heater and vaporizing system which is easy to install and which heats the fuel in a manner which reduces emissions from the engine or the generator, and the like.

SUMMARY OF THE INVENTION

In accordance with the present disclosure, there is provided a fuel heater and vaporizing system which broadly comprises a source of fuel, a source of heated fluid and/or engine exhaust, and/or hot engine component(s), and a heat exchanger for thermally contacting the source of heated fluid and/or engine exhaust, and/or hot engine component(s), which heat exchanger has a saddle shape and fits over the source of heated fluid and/or engine exhaust, and/or hot engine component(s).

In accordance with the present disclosure, there is provided a fuel heater and vaporizing system comprises a source of fuel; a thermal source; and a heat exchanger configured to thermally couple to the thermal source, the heat exchanger having a saddle shape and being configured to fit over the thermal source.

In an alternative embodiment the heat exchanger has an inlet for receiving fuel from the fuel source, an outlet for discharging fuel, and a hollow passageway extending between the inlet and the outlet.

In an alternative embodiment the heat exchanger has a first sidewall with the inlet, a second sidewall with the outlet, and at least one of an arcuate shaped region and multi-angled region between the first and second sidewalls.

In an alternative embodiment the heat exchanger has an open bottom to allow the heat exchanger to be placed over the thermal source.

In an alternative embodiment the heat exchanger further has at least one coupler configured to hold the heat exchanger in place.

In an alternative embodiment a catalyst system for cracking the heated fuel is included.

In an alternative embodiment the catalyst system comprises a catalyst holder and a plurality of at least one of rods and ribbons of dissimilar metals within the catalyst holder for creating a galvanic reaction.

In an alternative embodiment the plurality of rods and ribbons include a plurality of rods and ribbons formed from a first material and at least one rod/ribbon formed from a second material.

In an alternative embodiment the first material is aluminum or an aluminum alloy, nickel chrome alloy and the second material is one of zinc, a zinc alloy, and zinc plated steel.

In an alternative embodiment the plurality of rods and ribbons formed from the first material are present in a ratio of 2:1 with respect to the at least one rod/ribbon formed from the second material.

In an alternative embodiment the catalyst holder has a plurality of rods/ribbons formed from the second material.

In an alternative embodiment the source of heated fuel is at one of an exhaust muffler, turbo assembly and an exhaust pipe from an engine.

In an alternative embodiment the fuel heater and vaporizing system further comprises a fuel line containing ambient fuel; an inlet line communicating with the fuel line for delivering fuel to the heat exchanger; and an outlet line communicating with the heat exchanger and the fuel line for delivering heated fuel.

In an alternative embodiment the fuel heater and vaporizing system further comprises a valve for allowing blending of the heated fuel with the ambient fuel.

Further in accordance with the present disclosure, there is provided a fuel heater and vaporizing system comprises a heat exchanger for heating a fuel to be supplied to an end use device and a catalyst system for receiving fuel from the heat exchanger and for cracking the heated fuel.

In an alternative embodiment the catalyst system comprises a catalyst holder and a plurality of metallic rods and/or ribbons within the catalyst holder for creating a galvanic reaction.

In an alternative embodiment the plurality of rods includes a plurality of rods and/or ribbons formed from a first metallic material and at least one rod/ribbon formed from a second metallic material.

In an alternative embodiment the first metallic material is aluminum or an aluminum alloy and the second material is one of zinc, a zinc alloy, and zinc plated steel.

In an alternative embodiment the plurality of rods and/or ribbons formed from the first material are present in a ratio of 2:1 with respect to the at least one rod/ribbon formed from the second material.

In an alternative embodiment the catalyst holder has a plurality of rods and/or ribbons formed from the second material.

In an alternative embodiment the heat exchanger is placed into thermal conductive contact with a thermal source of an engine.

In an alternative embodiment the thermal source is one of a radiator hose containing a heated coolant, an exhaust manifold, a turbo charger housing, an engine block, and an engine valve cover.

In an alternative embodiment the heat exchanger has an open-bottom saddle shaped formed by first and second spaced apart sidewalls and an intermediate arcuate shaped region in which the fuel to be heated flows.

Further in accordance with the present disclosure, there is provided a process for heating a fuel to be supplied to an end use device comprises the steps of providing a heat exchanger having an inlet, an outlet, and an arcuate shaped intermediate region. The process includes placing the heat exchanger into thermally conductive contact with a source of heat; heating the fuel by flowing the fuel through the heat exchanger while the heat exchanger is in contact with the source of heat; and cracking the fuel.

In an alternative embodiment the source of heat comprises one of a radiator hose, an exhaust manifold, a turbo charger housing, an engine block, and an engine valve cover, the process further comprises thermally coupling the heat exchanger to at least one of, the radiator hose, an exhaust manifold, a turbo charger housing, an engine block, and an engine valve cover.

In an alternative embodiment the cracking step comprises providing a catalyst system having a catalyst holder in which a plurality of rods and/or ribbons formed from dissimilar materials is placed and flowing the heated fuel into the catalyst holder and around the plurality of rods and/or ribbons.

In an alternative embodiment the process further comprises blending the heated fuel with fuel at ambient temperature.

In an alternative embodiment the process further comprises operating at least one valve responsive to at least one of a thermostat control and a manual control.

Further in accordance with the present disclosure, there is provided a fuel heater and vaporizing system which broadly comprises a heat exchanger for heating a fuel to be supplied to an end use device, and a catalyst system for receiving fuel from the heat exchanger and is utilized as a catalyst for cracking the heated fuel.

Still further in accordance with the present disclosure, there is provided a process for heating a fuel to be supplied to an end use device comprises the steps of providing a heat exchanger having an inlet, an outlet, and an arcuate shaped intermediate region, placing the heat exchanger into thermally conductive contact with a source of heat, heating the fuel by flowing the fuel through the heat exchanger while the heat exchanger is in contact with the source of heat, and cracking the fuel.

Other details of the fuel vaporizing system are set forth in the following detailed description and the accompanying drawings wherein like reference numerals depict like elements.

DETAILED DESCRIPTION

Figure 1:
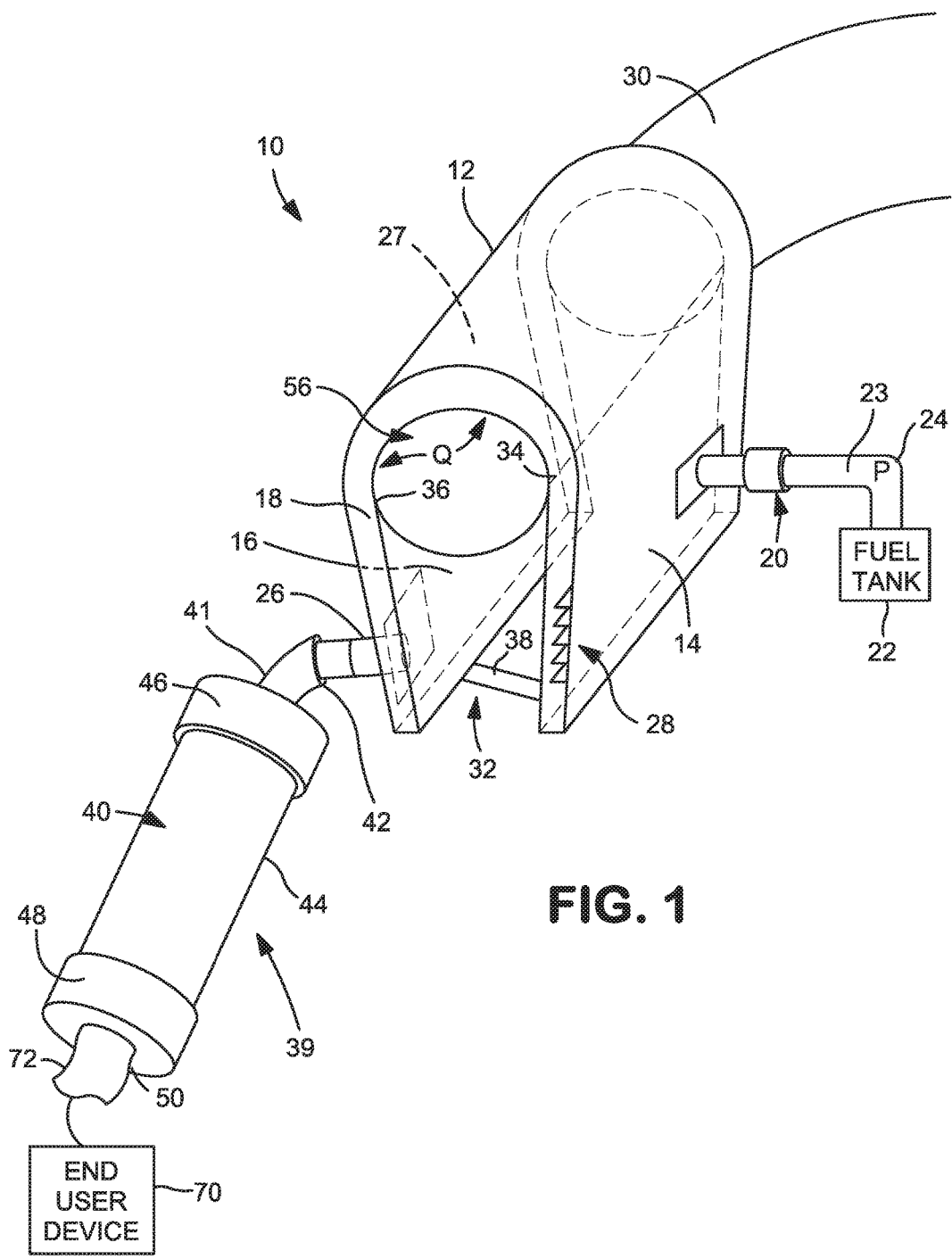
FIG. 1 is a schematic representation of the fuel heating and vaporization system of the present invention.

Referring now to FIG. 1, there is shown a system 10 for preheating fuel to be supplied to a motor engine, such as a diesel engine, or a diesel generator for generating electric power, and other diesel engine applications. The fuel which is heated and vaporized may be gasoline, alcohol, kerosene, diesel, or ethanol. Depending upon the type of fuel, the fuel will be heated at different temperature ranges.

The fuel heating and vaporizing system 10 includes a heat exchanger 12 into which fuel is introduced and heated. The heat exchanger 12 preferably has sidewalls 14 and 16 and an arcuate shaped region 18 connecting the sidewalls 14 and 16. The sidewall 14 has an inlet 20 into which fuel to be heated is introduced from a source of fuel or simply a tank 22 via a connection line 23. A fuel pump 24 may be provided to create a flow of fuel from the tank 22 to the inlet 20.

The heat exchanger 12 has an outlet 26 through which the heated fuel leaves the heat exchanger. The heat exchanger 12 may have a hollow interior through which the fuel flows from the inlet 20 to the outlet 26. The hollow interior may comprise a single passageway 27 for the fuel or may have walls or baffles 28 which create a plurality of passageways within the hollow interior. The baffles 28 are configured to direct the fuel flow and to increase the surface area of the heat exchanger 12.

As can be seen from FIG. 1, the arcuate shaped region 18 fits over a hose 30 which contains a heated fluid. The hose 30 may be a radiator hose and the heated fluid may be the heated coolant which flows through the radiator hose. Alternatively, the hose 30 can be part of the exhaust system which is heated via the exhaust side of the engine. Still further, the hose 30 may be any fluid conduit which contains a heated fluid. Portions 34, 36 of the sidewalls 14 and 16 are in contact with the sidewalls of the hose 30. In a preferred embodiment, the heat exchanger 12 has a saddle shape formed by the arcuate shaped region 18 and the sidewalls 14 and 16. The sidewalls 14 and 16 taper inwardly to ensure a tight fit of the heat exchanger 12 around the hose 30. This causes the hose 30 to be slightly depressed so as to be pushed into place and held in position. If the hose 30 is rigid, then the two sidewalls 14 and 16 may be straight to enable the heat exchanger 12 to fit snugly over the hose or pipe 30. The heat exchanger 12 has a bottom opening 32 which allows the heat exchanger to be easily placed over the hose or pipe 30. If desired, one or more couplers 38, such as, straps, fasteners, bolts, screws and the like may be provided to hold the heat exchanger 12 in place with the respect to the engine component, hose or pipe 30.

The heat exchanger 12, and in particular, the portions of the sidewalls 14 and 16 contacting the hose 30 and the portion of the arcuate shaped region 18 contacting the hose, may be formed from any suitable thermally conductive material known in the art. For example, the heat exchanger 12 and the aforementioned portions thereof may be formed from a metallic material or a plastic material which is thermally conductive and resistant to higher temperatures. In use, the arcuate shaped region 18 and the contact portions 34 and 36 of the sidewalls 14 and 16 are placed in contact with the hose or pipe 30 so that heat, i.e., thermal energy, is conductively transferred from a thermal source 56 to the fuel flowing into and through the heat exchanger 12. The thermal source 56 can include at least one of an engine coolant, engine exhaust, transmission fluid, engine heat from oil, hydraulic fluid, and hot engine components.

One of the advantages of the heat exchanger 12 described herein is that there is a reduced potential for leaks since there is only an inlet, an outlet, and an intermediate hollow passageway in the sidewalls 12 and 14 and the arcuate shaped region 18.

After the fuel has been heated in the heat exchanger 12, the fuel may flow to a catalyst system 39. The catalyst system 39 includes a catalyst holder 40. The heated fuel is caused to flow to an inlet 41 of the catalyst holder 40 via a connecting fuel line 42. In the catalyst holder 40, the heated fuel is cracked. This is done by providing the catalyst holder 40 with a plurality of rods and/or wires and/or ribbons formed from different materials, and in particular dissimilar metallic materials which create a galvanic response.

Figure 2:
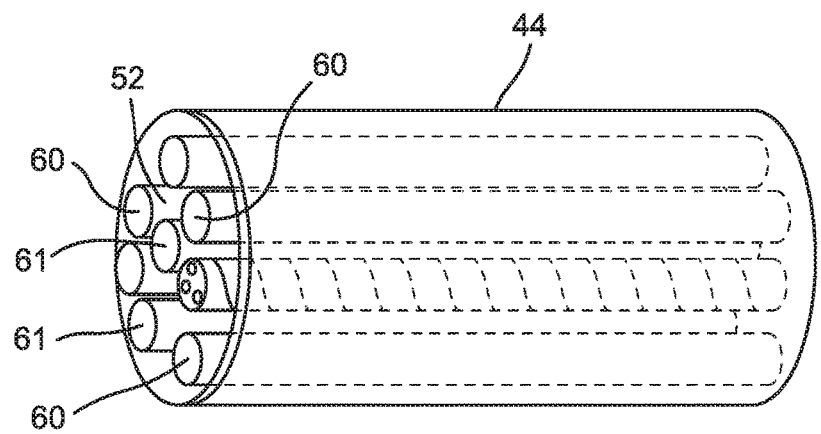
FIG. 2 is a sectional view of a catalyst holder used with the fuel heating and vaporization system of FIG. 1.

As shown in FIGS. 1 and 2, the catalyst holder 40 is formed by a cylindrical tube 44 having end caps 46 and 48. The end cap 46 includes the inlet 41 and the end cap 48 includes an outlet 50. The cylindrical tube 44 creates a volumetric space 52 in which the heated fuel flows. As can be seen from FIG. 2, a plurality of solid rods and/or ribbons and or wires 60 and 61 are positioned within the space 52.

The rods and/or ribbons 60 and 61 are present in multiples of three. The fuel flowing in the catalyst holder 40 flows around the rods and/or ribbons 60 and 61 and causes the rods and/or ribbons 60 and 61 to become heated. The plurality of solid rods and/or ribbons and or wires 60 and 61 can be configured as braided or twisted together. The braided configuration increases the contact area between the dissimilar materials. In an exemplary embodiment, the braided plurality of solid rods and/or ribbons and or wires 60 and 61 can be inserted along the fuel flow path, in the fuel line 42 and/or the hollow passageway 27 or space 52. The braided configuration can accommodate a high volume of ion production per length of plurality of solid rods and/or ribbons and or wires 60 and 61.

The rods and/or ribbons 60 may be formed from aluminum, an aluminum alloy, nickel chrome alloy and the like. The rods and/or ribbons 61 may be formed from zinc, a zinc alloy, zinc plated steel, nickel, chromium, platinum, copper and aluminum. In a preferred embodiment, the ratio of the rods and/or ribbons 60 to the rods and/or ribbons 61 is 2:1. In other words, there are two rods/ribbons 60 for each rod/ribbon 61. As noted above, the dissimilar materials of the rods/ribbons 60 and 61 create a galvanic response which comprises a stream of metallic ions which helps to crack the fuel. Cracking helps improve the emissions that are put out by the end use device 70, namely an engine or a generator, to which the heated and cracked fuel flows.

Referring now to FIG. 1, the heated and cracked fuel flows from the catalyst holder 40 to the end use device 70 via fuel line 72. Fuel which has been heated and treated with ions using the system 10 including catalyst system 40 of the present invention is better atomized in the end use device 70 and thus burns cleaner, leading to reduced emissions. If desired, the catalyst system may have the rods/ribbons 60 and 61 laying on top of one another in the hollow outlet side of the heat exchanger 12 between the outer wall 14 and the inner wall 16.

Figure 3:
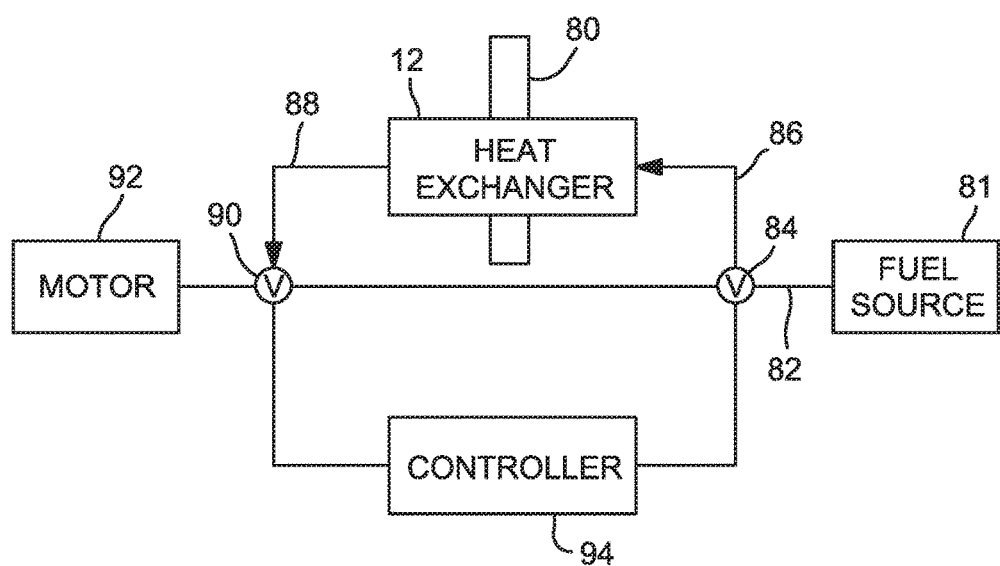
FIG. 3 is a schematic representative of an alternative fuel heating and vaporization system including a temperature range controller.

While the source of heat has been described as being a radiator hose 30, it could be an exhaust muffler or exhaust pipe 80 on top of a motor. Referring now to FIG. 3, there is shown an embodiment wherein a heat exchanger 12 placed on top of a muffler or exhaust pipe 80. The heat exchanger 12 may be configured as shown in FIG. 1. In this embodiment, the heat exchanger 12 receives fuel from a fuel line 82 containing fuel at ambient temperature via valve 84 and inlet line 86. Ambient temperature refers to the temperature of the environment where the fuel is stored in source 81. The system further has a heated fuel outlet line 88 which may be open or closed via valve 90. The heated fuel exiting the heat exchanger 12 may be mixed or blended with the fuel in the fuel line 82. By doing this, the temperature of the fuel flowing to the motor 92 may be controlled. One or more controllers 94 may be provided to control the valves 84 and 90 and this regulates the flow of fuel to/from the heat exchanger 12 and the temperature of the fuel. For example, if desired, the valve 90 may be operated so that (1) only heated fuel flows to the motor 92; (2) only ambient temperature fuel flows to the motor 92; or (3) a blend of heated/ambient fuel at a desired temperature flows to the motor 92.

Figure 4:
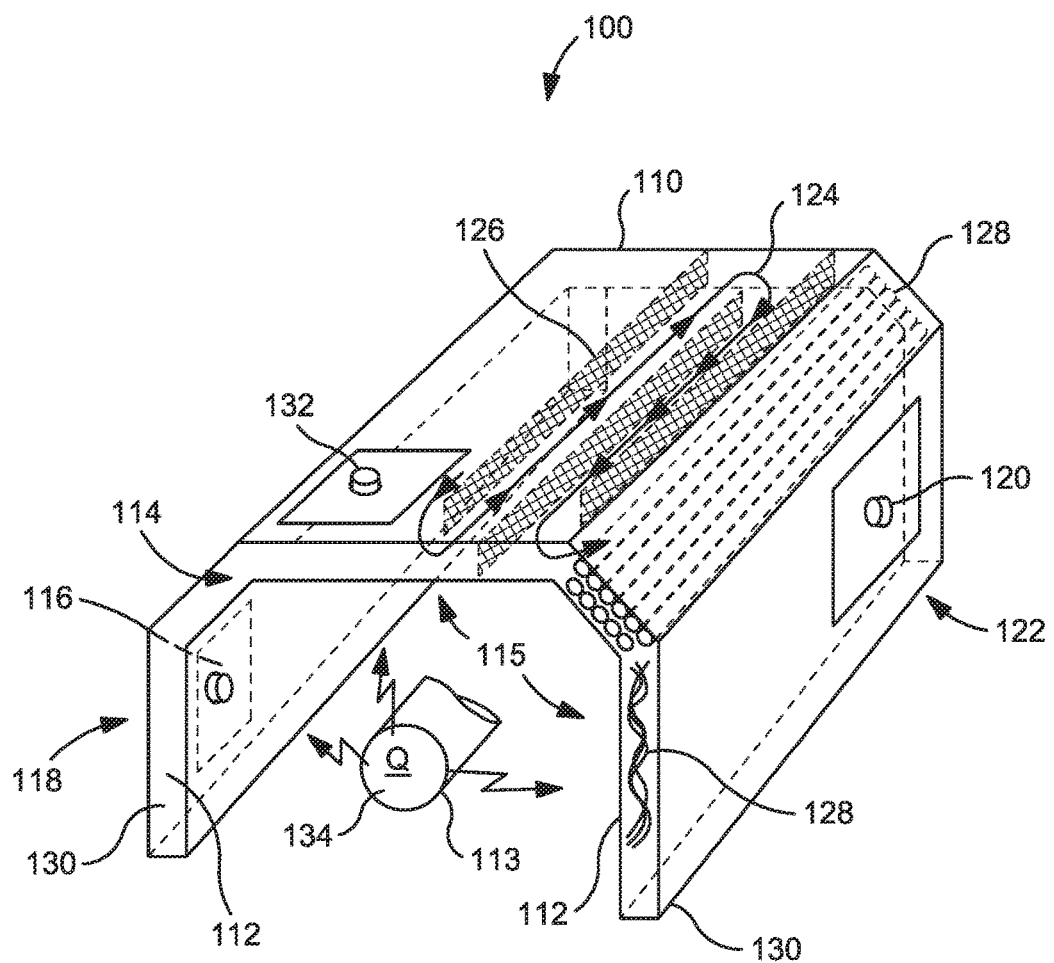
FIG. 4 is a schematic representation of an alternative embodiment of the fuel heating and vaporization system of the present invention.

Referring to FIG. 4, another alternative embodiment of a heating and vaporizing system 100 can be seen. The heating and vaporizing system 100 includes a heat exchanger 110 having sidewalls 112. The sidewalls 112 form a volumetric space 114. The sidewalls 112 can be aligned to form a multi-angled region 115 configured to receive an engine component 113, such as a hose 30 shown at FIG. 1, or other engine component that produces thermal energy. An inlet 116 is formed in the sidewall 112 at a first location 118. An outlet 120 is formed in the sidewall 112 at a second location 122 distally from the first location 118. Fuel flow 124 (shown as arrows) can be directed through the volumetric space 114 from the inlet 116 to the outlet 120.

Baffles 126 can be located in the volumetric space 114 and configured to direct the fuel flow 124 in a serpentine fashion and configured to maximize the heat transfer to the fuel flow 124. The baffles 126 also are configured to situate a catalyst material 128 in a position to maximize the ionic activity between the fuel flow 124 and the catalyst 128. The catalyst material 128 in the form of braided wire can also be located along the fuel flow path in the space 114. The volumetric space 114 can include legs 130 that are hollow. The legs 130 can also facilitate storage of the catalyst 128. A port 132 can be included in the heat exchanger 110 that is configured to vent air entrapped in the fuel flow 124. The port 132 can also be utilized to add fuel into the heat exchanger 110. As in the embodiments described above, the heat exchanger 110 is configured to thermally couple with a heated engine source, such as a valve cover or exhaust manifold. The relatively hot valve cover or exhaust manifold is a thermal source 134 or simply a source of heat.

The fuel heater and vaporizing system described herein may be used with any internal combustion engine, diesel engine, or any electrical generator which burns fuel. The fuel heater and vaporizing system 10 described herein has particular utility in heating and vaporizing diesel fuel used in diesel engines and for heating and vaporizing fuel used in engines that drive barges and diesel generator power plants and other diesel engine applications.

The fuel heater and vaporizing system described herein allows the combustion process to change allowing more O2 to the hydrocarbon molecules, thus releasing more energy and burning some of the H2 that is released during use of the device.

There has been provided in accordance with the instant disclosure a fuel heating and vaporizing system. While the fuel heating and vaporizing system has been described in the context of a specific embodiment thereof, other unforeseen alternatives, modifications, and variations may become apparent to those skilled in the art having read the foregoing detailed description. Accordingly, it is intended to embrace those alternatives, modifications, and variations as fall within the broad scope of the appended claims.

What is claimed is:

1. A fuel heater and vaporizing system comprising:
   a source of fuel;
   a thermal source; and
   a heat exchanger configured to thermally couple to the thermal source, said heat exchanger having a saddle shape and being configured to fit over said thermal source;
   wherein said heat exchanger has an inlet for receiving fuel from said fuel source, an outlet for discharging fuel, and a hollow passageway extending between the inlet and the outlet; wherein said heat exchanger has an open bottom to allow said heat exchanger to be placed over said thermal source.

2. The fuel heater and vaporizing system of claim 1, wherein said heat exchanger has a first sidewall with said inlet, a second sidewall with said outlet, and at least one of an arcuate shaped region and multi-angled region between said first and second sidewalls.

3. The fuel heater and vaporizing system of claim 1, wherein said heat exchanger further has at least one coupler configured to hold the heat exchanger in place.

4. The fuel heater and vaporizing system of claim 1, further comprising a catalyst system for cracking the heated fuel.

5. The fuel heater and vaporizing system of claim 4, wherein said catalyst system comprises a catalyst holder and a plurality of at least one of rods and ribbons of dissimilar metals within said catalyst holder for creating a galvanic reaction.

6. The fuel heater and vaporizing system of claim 5, wherein said plurality of rods and ribbons include a plurality of rods and ribbons formed from a first material and at least one rod/ribbon formed from a second material.

7. The fuel heater and vaporizing system of claim 6, wherein said first material is aluminum or an aluminum alloy, nickel chrome alloy and the second material is one of zinc, a zinc alloy, and zinc plated steel.

8. The fuel heater and vaporizing system of claim 6, wherein said plurality of rods and ribbons formed from said first material are present in a ratio of 2:1 with respect to said at least one rod/ribbon formed from said second material.

9. The fuel heater and vaporizing system of claim 6, wherein said catalyst holder has a plurality of rods/ribbons formed from said second material.

10. The fuel heater and vaporizing system of claim 1, wherein said source of heated fuel is at one of an exhaust muffler, turbo assembly and an exhaust pipe from an engine.

11. The fuel heater and vaporizing system of claim 10, further comprising:
a fuel line containing ambient fuel;
an inlet line communicating with said fuel line for delivering fuel to said heat exchanger; and
an outlet line communicating with said heat exchanger and said fuel line for delivering heated fuel.

12. The fuel heater and vaporizing system of claim 11, further comprising a valve for allowing blending of said heated fuel with said ambient fuel.

13. A fuel heater and vaporizing system comprising:
a heat exchanger for heating a fuel to be supplied to an end use device, wherein said heat exchanger has an open-bottom saddle shape formed by first and second spaced apart sidewalls and an intermediate arcuate shaped region in which the fuel to be heated flows; and
a catalyst system for receiving fuel from the heat exchanger and for cracking the heated fuel.

14. The fuel heater and vaporizing system of claim 13, wherein said catalyst system comprises a catalyst holder and a plurality of metallic rods and/or ribbons within said catalyst holder for creating a galvanic reaction.

15. The fuel heater and vaporizing system of claim 14, wherein said plurality of rods includes a plurality of rods and/or ribbons formed from a first metallic material and at least one rod/ribbon formed from a second metallic material.

16. The fuel heater and vaporizing system of claim 15, wherein said first metallic material is at least one of aluminum, an aluminum alloy, a nickel chrome alloy and the second material is at least one of zinc, zinc alloy, zinc plated steel, nickel, chrome, platinum, and copper.

17. The fuel heater and vaporizing system of claim 15, wherein said plurality of rods and/or ribbons formed from said first material are present in a ratio of 2:1 with respect to said at least one rod/ribbon formed from said second material.

18. The fuel heater and vaporizing system of claim 15, wherein said catalyst holder has a plurality of rods and/or ribbons formed from said second material.

19. The fuel heater and vaporizing system of claim 13, wherein said heat exchanger is placed into thermal conductive contact with a thermal source of an engine.

20. The fuel heater and vaporizing system of claim 13, wherein said thermal source is one of a radiator hose containing a heated coolant, an exhaust manifold, a turbo charger housing, an engine block, and an engine valve cover.

21. A process for heating a fuel to be supplied to an end use device comprises the steps of:
providing a heat exchanger having an inlet, an outlet, and an arcuate shaped intermediate region wherein said heat exchanger has an open-bottom saddle shape formed by first and second spaced apart sidewalls and said arcuate shaped intermediate region in which the fuel to be heated flows;
placing said heat exchanger into thermally conductive contact with a source of heat;
heating said fuel by flowing said fuel through said heat exchanger while said heat exchanger is in contact with said source of heat; and
cracking said fuel.

22. The process of claim 21, wherein said source of heat comprises one of a radiator hose, an exhaust manifold, a turbo charger housing, an engine block, and an engine valve cover, said process further comprising:
thermally coupling said heat exchanger to at least one of, said radiator hose, an exhaust manifold, a turbo charger housing, an engine block, and an engine valve cover.

23. The process of claim 21, wherein said cracking step comprises providing a catalyst system having a catalyst holder in which a plurality of rods and/or ribbons formed from dissimilar materials is placed and flowing said heated fuel into said catalyst holder and around said plurality of rods and/or ribbons.

24. The process of claim 21, further comprising blending said heated fuel with fuel at ambient temperature.

25. The process of claim 24, further comprising operating at least one valve responsive to at least one of a thermostat control and a manual control.

* * * * *